MAGNETIC RECORDER WITH TAPE DRIVEN FLYWHEELS

Filed Dec. 3, 1963 3 Sheets-Sheet 1

MAGNETIC RECORDER WITH TAPE DRIVEN FLYWHEELS

Filed Dec. 3, 1963

3 Sheets-Sheet 2

MAGNETIC RECORDER WITH TAPE DRIVEN FLYWHEELS

Filed Dec. 3, 1963 3 Sheets-Sheet 3

United States Patent Office 3,342,950

Patented Sept. 19, 1967

3,342,950

MAGNETIC RECORDER WITH TAPE DRIVEN FLYWHEELS

Karl-Georg Schwarz, Karlsruhe, Anton Hüdek, Linkenheim, and Walter Johner, Karlsruhe, Germany, assignors to Siemens & Halske Aktiengesellschaft, Berlin and Munich, Germany, a corporation of Germany Filed Dec. 3, 1963, Ser. No. 327,597
Claims priority, application Germany, Aug. 27, 1963, S 86,922
18 Claims. (Cl. 179—100.2)

Figure 1:
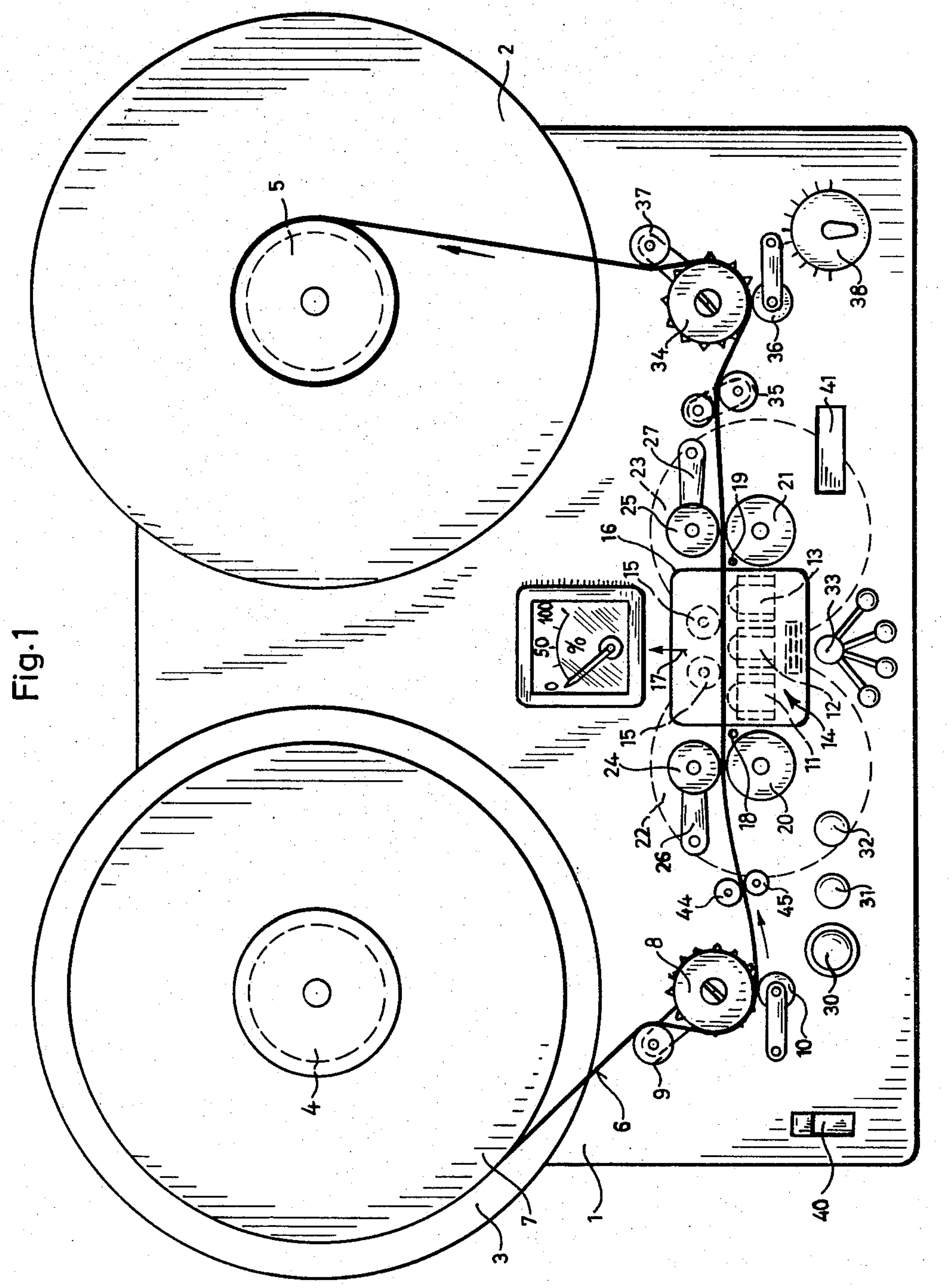

The invention disclosed herein is concerned with a magnetic recorder for perforated tape-like or film-like record carriers, for example, perforated films provided with a magnetic coating, wherein the respective recording and pickup heads are arranged between two rollers forming centrifugal masses which are provided with auxiliary drives, and wherein the record carrier is driven with the aid of sprockets provided with coupling means. The device as such will hereinafter be conveniently referred to as tape recorder or as magnetic recorder, and the record carrier will be referred to as tape or film.

A disadvantage of known devices of this kind resides in that they require cumbersome and inconvenient operations for the insertion of the tape which must be threaded about various rollers including, for example, the rollers operating the centrifugal masses. It may be mentioned that it is known to use, in connection with devices operating with perforated tapes, auxiliary means for driving the centrifugal masses for accelerating rotation to the rated speed of revolution.

In connection with another type of magnetic tape recorders, in which the drive of the tape is not effected by means of sprockets in engagement with perforations, the tape may run along a nearly straight line, since there is used only one centrifugal mass which is cooperatively connected with the respective drive.

It is also known to provide devices of the above indicated type with two driven centrifugal masses between which are arranged magnetic heads, wherein the tape is pressed against the centrifugal masses by pressure rollers which can be lifted off during the replay operation. The tape is then moved solely by the action of the winding motors.

The drive of the tape is in the case of perforated tapes effected through the medium of the perforations, which by themselves cause irregularities in the running of the tape, and it follows, therefore, that a connection involving the centrifugal mass and drive roller, cannot eliminate this drawback. While it is known from sound film projectors to avoid this difficulty by using centrifugal masses which are driven only by the film, such arrangement is suitable only in connection with a sound film which is continuously operated in one direction of motion.

The problem and object of the present invention is to provide a magnetic recorder operating with perforated magnetic tape, which enables convenient and simple insertion of the tape and permits, aside from normal operation, instantaneous switching over to "Stop" as well as rapid forward motion and reverse motion of the tape, and wherein irregularities in the running of the tape, caused by perforations, are eliminated.

The recorder according to the invention exhibits a number of characteristic features. The tape is, upon stopping and upon rapid forward and reverse motion thereof, disengaged from the rollers of the centrifugal masses which are at such instants actuated at normal speed by the auxiliary drive means, while the sprockets are coupled with their respective drives only upon operation with normal speed. Rollers are provided in a preferred embodiment, which are arranged respectively adjacent to or between the magnetic heads, for causing the tape to slightly embrace the poles of the magnetic heads.

According to another feature of the invention, there are provided electromagnets for disengaging the pressure rollers acting upon the centrifugal masses so that the tape does not carry along the rollers for the centrifugal masses, for example, upon rapid forward motion or rewinding thereof.

In accordance with a further preferred embodiment of the invention, at least one magnetic head can be brought into engagement with the tape, so that the record can be listened to even at intervals when the centrifugal masses are not operatively effective.

Movable rollers, pins or the like are advantageously provided for lifting the tape during the motion thereof from the magnetic heads.

According to still another embodiment of the invention, the rollers for the centrifugal masses are provided with auxiliary means for continuously driving them during pauses with the normal speed. The operation is appropriately effected so that the auxiliary drive for the rollers of the centrifugal masses is upon turning on the recorder (preparatory position) positively switched in, while being respectively disconnected or declutched upon normal operation, that is, placement of the pressure rollers in engagement with the running tape. The pressure rollers for the centrifugal masses are in an embodiment of the invention positively controlled in such a manner that they become effective only upon forward operation of the drive with normal speed, while the auxiliary drive is disconnected, so that the corresponding rollers can be taken along only by the film or tape. An embodiment of the invention is characterized thereby that the tape is in known manner brought into engagement with the roller of the centrifugal mass, by the action of a rubber pressure roller disposed upon a pivoted holder arm which cooperates positively with the coupling or clutch for the auxiliary drive of the centrifugal mass, such that the centrifugal mass is driven only when the pressure roller and therefore the tape or film is lifted off from the rollers of the centrifugal masses.

In a preferred embodiment of the invention, there is provided a belt between a driving roller and a spring controlled roller, which belt can be placed in engagement with a centrifugal mass or disengaged therefrom by means of a pivotally disposed deflection roller. An arm is advantageously provided upon the pivotal axis of the deflection roller for the belt of the auxiliary drive, which arm acts upon the holder arm for the rubber pressure roller, if desired, through the medium of a pull rod over a resilient intermediate member. The arrangement is rendered particularly simple by the provision of a release spring for lifting off the rubber pressure roller from the tape or the centrifugal mass, respectively, and a spring acting oppositely to the release spring, preferably a coiled spring, disposed upon the rotation axis of the holding arm of the rubber pressure roller, which latter spring is tensioned at the instant when the centrifugal mass is coupled or clutched by the auxiliary drive. The embodiment also provides for an actuation of the deflection roller and the rubber pressure roller, by a rotary magnet which preferably acts on the pivotal axis of the deflection roller.

The various objects and features of the invention will appear from the appended claims and from the description which is rendered below with reference to the accompanying drawings.

Figure 1A:
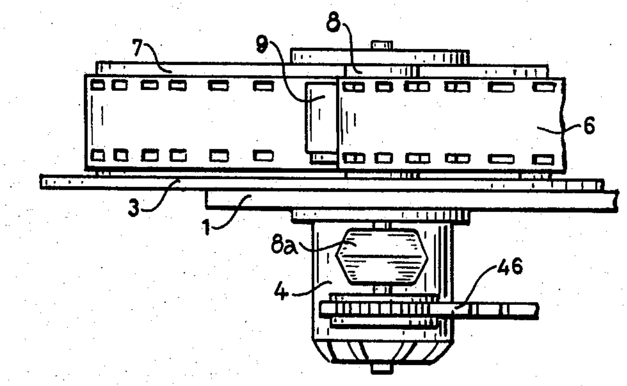

FIG. 1 shows a top elevational view of a magnetic recorder employing the features according to the invention;

FIG. 1*a* represents a detail of the sprocket drive; and

Figure 2:
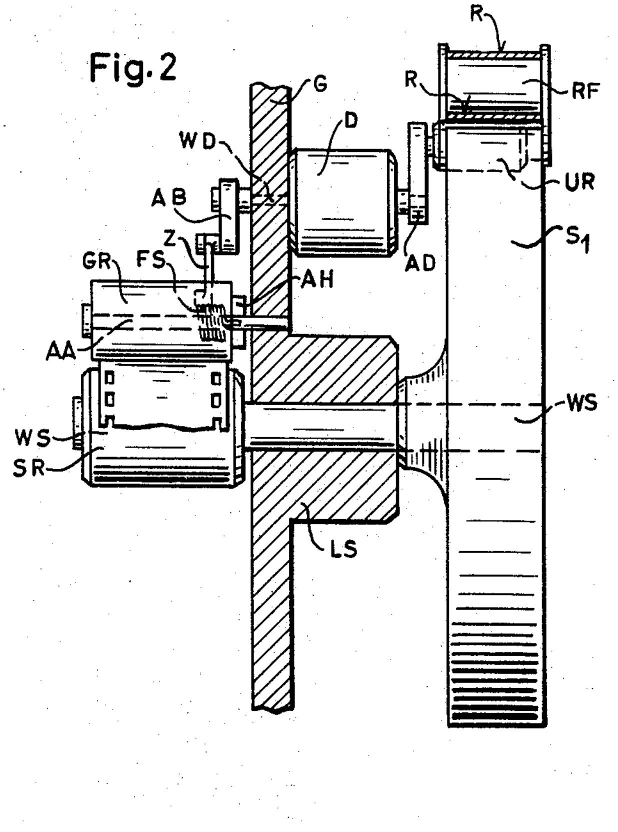
Figure 3:
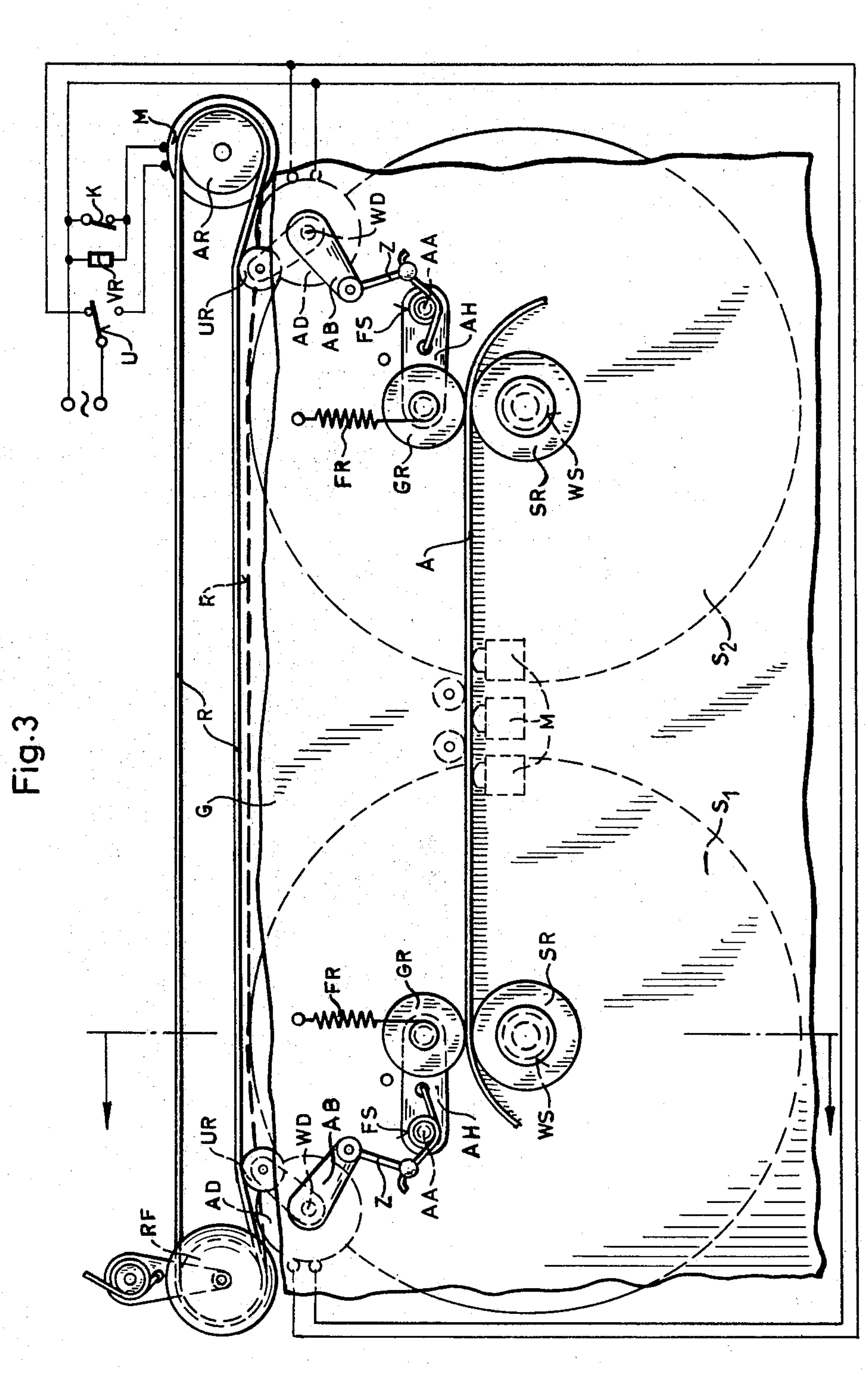

FIG. 2 is a cross-sectional view and FIG. 3 a schematic top view, showing the principles employed in connection with an auxiliary drive for the centrifugal masses, FIG. 3 considering a mechanism comprising two centrifugal masses $S_1$ and $S_2$. The elements cooperatively associated with the respective centrifugal masses are similar and therefore are identically referenced.

As shown in FIGS. 1 and 1*a*, there is provided a base or mounting plate 1 upon which are arranged a tape or film receiving support 2 and a tape or film supply support 3, which are respectively driven by winding motors 4 and 5. The record carrier 6 which is made in the form of a perforated film or tape, is drawn from the supply reel 7 over the sprocket 8 and the deflection roller 9. Cooperating with the sprocket 8 is a pivotally arranged pressure roller 10 which is omitted in FIG. 1*a*.

There are provided three magnetic heads 11, 12, 13, respectively, for erasure, recording and pickup, which are combined in a shielded unit 14. A roller 15 is disposed between the magnetic heads 11, 12 and 12, 13, for causing the tape to slightly embrace the respective magnetic heads. The rollers 15 are advantageously arranged in a common housing 16 which can be moved in the direction of the arrow 17 when it is desired to lift the tape from the magnetic heads so as to reduce frictional wear, for example, during rapid advance or during the rewinding of the tape. Movably disposed pins 18 and 19, which are likewise displaceable in the direction of the arrow 17, serve the same purpose.

Smooth rollers 20, 21 are disposed alongside the magnetic head unit 14, such rollers being connected with fly wheels 22, 23 which are positioned underneath the plate 1 and form the centrifugal masses. The rollers 20, 21 are carried along by the tape 6 during the motion thereof. Pressure rollers 24, 25 made of elastic material, for example, rubber, serve for increasing the friction for the driving of the rollers 20, 21 for the centrifugal masses. The pressure rollers 24, 25 are held by pivotally disposed arms 26, 27 which can be tilted so as to be lifted with respect to the rollers 20, 21. The lifting operation is advantageously effected by electromagnetic devices which are controlled by actuating elements, that is, by the control knobs such as 30, 31, 32. The control effected by these knobs is apparent from FIGS. 2 and 3.

The knob 30 for effecting the recording operation is appropriately provided with a warning lamp so as to prevent inadvertent actuation. The knob 31 serves for switching the recorder to pickup (reproduce) and the knob 32 is provided for stopping the recorder. Upon actuation of the knob 32, the rubber pressure rollers 24, 25 are lifted and the device for the winding plates 2 and 3 are stopped while the auxiliary drives for the two centrifugal masses are operatively reconnected. The sprockets 8 and 34 are likewise stopped.

The switch 33 serves for setting the recorder in accordance with desired operation, that is, from normal operation to feed by means of a frequency converter (rotosyn operation), rewinding, listening to the record, etc. The tape is moved with respect to the magnetic head unit 14 by means of the sprocket 34. Irregularities in the running of the tape, caused by the teeth of the sprocket 34, are filtered out with the aid of the resiliently operating double roller 35. It is in most cases of advantage to provide in back of the sprocket 8 a brake roller 45 against which the tape is pressed by means of a rubber roller 44. Numeral 36 indicates a pressure roller for the sprocket 34 and numeral 37 a deflection or tensioning roller for the tape.

A switch 38 is provided for setting the direction of tape motion and tape speed when the switch 33 is in the rewind position. Upon rewinding, only the drive motors 4 and 5 for the winding plates 2 and 3 are operatively actuated while the sprockets 8 and 34 are declutched from their respective drives (not shown in FIG. 1). The clutches or coupling required therefor can be mechanically actuated by the switch 33 with the aid of suitable link means or the like. As indicated in FIG. 1*a*, magnetic coupling means 8*a* which can be actuated with the aid of the switch 33, are particularly suitable for this purpose. The drive is effected by means of a toothed belt 46.

A counter 41 for recording the length of film or tape is suitably coupled with the sprocket 34 and actuated thereby also during the rewinding operation. The pressure rollers 24, 25 and also the pressure rollers 15 are in the rewind position of the switch 33 lifted from the tape. However, the magnetic heads 11, 12, 13 may be brought into engagement with the tape 6 during the rewinding, by placing the switch 33 into the position "Listening," thus making it possible to listen to the record and, if required, to stop the drive during the rewinding, at places at which given signals had been recorded. In the case of rotosyn operation, the sprockets 8 and 34 are always coupled with their drives while the rubber rollers 24, 25 are during reverse advance lifted off. The drives for the centrifugal mass rollers 20, 21 are in such case advantageously fed from a current source which is independent of the rotosyn network.

The rollers 20, 21 for the centrifugal masses are provided with auxiliary drives, not shown in FIGS. 1 and 1*a*, which impart thereto, so long as the recorder is preparatorily switched on by means of the switch 40, a speed of rotation corresponding to the desired speed of the tape. However, the rollers 20, 21 are in engagement with the tape only during the forward advance thereof. The respective auxiliary drives, for example, separate drive motors, are thereby disconnected.

In FIG. 2, which shows a cross-sectional view taken along the axis of the centrifugal mass $S_2$, the record carrier is assumed to be, for example, a perforated film A which is provided with a magnetic coating and which is for convenience also referred to as tape. Such film or tape A is, during the normal advance thereof, by the action of the rubber pressure roller GR in engagement with the smooth roller SR for the centrifugal mass $S_2$ and drives such mass with the aid of the shaft WS which is journalled in the base plate G by means of the bearing LS. The rubber pressure roller GR is by the action of the coiled spring FS pressed against the roller SR. The coiled spring FS acts with one end thereof on the holder arm AH of the rubber pressure roller GR and is with its other end hooked into the pull rod Z which is fastened to the arm A, the latter being arranged upon the shaft WD of the rotary magnet D.

The rotary magnet D is in the illustrated position energized. Upon interruption of the current feed for the rotary magnet D, the arm A will swing downwardly and, as is apparent from FIG. 3, the rubber pressure roller GR is by the action of the release spring or lifting spring FR moved into the broken line position. Rotation of the shaft WD of the rotary magnet D effects at the same time angular displacement of the deflection roller UR which is fastened to the arm AD, thus causing the flat belt R, at the time when the rubber pressure roller GR is lifted, to be brought into engagement with the centrifugal masses $S_1$ and $S_2$, as is indicated by the broken line.

The belt R moves at one end over a spring roller RF and at the other end over a drive roller AR which is driven by the motor M. The diameter of the centrifugal masses $S_1$ and $S_2$ as well as the drive roller AR, and the speed of rotation of the motor M, are so dimensioned that the rollers SR for the centrifugal masses operate with a speed corresponding to the speed of advance of the record carrier (film or tape) A which is accordingly without delay brought to its normal speed of advance responsive to placing the rubber pressure rollers GR in engagement with the rollers SR. The belt R is at the same time lifted from the centrifugal masses $S_1$ and $S_2$ by the action of the deflection rollers UR. Between the rollers SR for the centrifugal masses are in known manner arranged the magnetic heads.

As will be seen from FIG. 3, the motor M and the rotary magnets D can be fed from the same circuit. A break-make contact U is provided to assure that the motor M is disconnected when the rotary magnets are in the normal operation under current (illustrated position of the contact U).

In the event that the recorder is to be used with a main drive for the record carrier A which is to be operable according to two normal speeds, for example, sound film speed with 24 frames per second and television film speed with 25 frames per second, it will be advantageous to make the speed of revolution of the motor M adjustable with the aid of a series resistor VR which can be bridged by a contact K, such contact being actuated upon switching over the transport speed of the film or tape. In the case of induction motors, there are appropriately used two series resistors which can be connected serially with respect to the two phase windings.

It is in some cases advantageous to provide a delay circuit so as to effect running of the motor M before deenergization of the rotary magnets D, thus causing reengagement of the belt R with the centrifugal masses $S_1$ and $S_2$ as is required during the rewinding of the record carrier (film or tape) A.

Changes may be made within the scope and spirit of the appended claims which define what is believed to be new and desired to have protected by Letters Patent.

We claim:

1. A magnetic recorder for use with a perforated tape-like record carrier, sprockets for engaging said record carrier, drive means including clutch means for selectively driving said sprockets rotatable centrifugal masses and drive rollers for respectively rotating said masses, magnetic heads positioned between said drive rollers, pressure rollers for pressing the record carrier into engagement with said drive rollers so as to cause said record carrier to rotate such drive rollers and the respective centrifugal masses, auxiliary drive means for said centrifugal masses, means for stopping, rapidly advancing and reversing the motion of said record carrier, means for disengaging said record carrier from said drive rollers and simultaneously engaging said auxiliary drive means with said centrifugal masses during the periods of stop, rapid advance and reverse of said record carrier, said sprockets being driven only for advancing the record carrier with normal speed.

2. A recorder according to claim 1, wherein said record carrier extends between said sprockets over said drive rollers and the magnetic heads substantially along a straight line.

3. A recorder according to claim 2, including rollers for effecting engagement of said record carrier with said magnetic heads without particular deflection thereof.

4. A recorder according to claim 3, wherein at least one magnetic head can be brought into engagement with the record carrier for listening to the record at times when the centrifugal masses are not rotated by the action of the record carrier.

5. A recorder according to claim 4, comprising means for lifting the record carrier from the magnetic heads during the motion of the carrier.

6. A recorder according to claim 5, wherein the auxiliary drive for the centrifugal masses are placed in operation upon switching on the recorder while being disconnected upon actuation of the pressure rollers for pressing the record carrier against the drive rollers.

7. A recorder according to claim 6, including driven sprocket means respectively at the entry end of the record carrier into the recording mechanism of the recorder and at the exit end thereof, for driving the record carrier in forward direction, and spring controlled roller means in engagement with the record carrier at the exit end thereof for compensating irregularities caused by the sprocket operation in cooperation with the perforations of the record carrier.

8. A recorder according to claim 7, including winding motors for driving the record carrier at instants when the sprockets are declutched and idling.

9. A recorder according to claim 8, comprising switching means for adjusting the winding motors so as to advance the record carrier to move respectively forwardly and in reverse direction with controlled speed.

10. A recorder according to claim 9, including a pivotal holding arm for said pressure roller cooperating with the auxiliary drive means of the respective centrifugal mass in such a manner that the corresponding centrifugal mass is driven by the auxiliary drive therefor at times when the pressure roller and therewith the record carrier are lifted from engagement with the drive roller.

11. A recorder according to claim 10, said auxiliary drive means comprising a belt extending between a driving roller and a spring biased roller, and pivotally disposed deflection roller means for selectively effective engagement of said belt with a centrifugal mass.

12. A recorder according to claim 11, including two centrifugal masses which are driven by said belt.

13. A recorder according to claim 12, including a separate motor for operating the belt forming the auxiliary drive means for said centrifugal masses.

14. A recorder according to claim 13, including an arm disposed upon the pivotal axis of the deflection roller for the belt of the auxiliary drive means, said arm cooperating with a pull bar over a resilient intermediate element for affecting the operation of the holding arm of the pressure roller.

15. A recorder according to claim 14, including a tension spring for lifting the pressure roller from engagement with the record carrier and therewith from the drive means for the centrifugal masses, and a coiled clutch spring provided upon the rotation axis of the holding arm and opposing the force of said tension spring.

16. A recorder according to claim 15, including a rotary magnet for actuating said deflection roller and said pressure roller, said rotary magnet acting with respect to the pivot axis of the deflection roller.

17. A recorder according to claim 16, including switching means for the rotary magnet and for the motor of the auxiliary drive for said centrifugal mass, said switching means being positively cooperatively connected so that the motor is operatively disconnected upon placing the pressure roller into operating position.

18. A recorder according to claim 17, including a series resistor for adjustably controlling the speed of rotation of said motor, and contact means for bridging said resistor, said contact means being actuated upon setting the transport speed for the record carrier.

References Cited

UNITED STATES PATENTS

| | | | |
|---|---|---|---|
| 2,702,705 | 2/1955 | Pettus | 226—169 |
| 2,996,948 | 8/1961 | Beachell | 179—100.2 |

BERNARD KONICK, *Primary Examiner.*

J. R. GOUDEAU, *Assistant Examiner.*